United States Patent
Lowe et al.

(10) Patent No.: US 6,606,327 B1
(45) Date of Patent: Aug. 12, 2003

(54) METHOD TO DYNAMICALLY ADJUST THE MAXIMUM BACK OFF TIME OF AN ETHERNET CONTROLLER IN A HALF DUPLEX NETWORK

(75) Inventors: Glen H. Lowe, Union City, CA (US); Leslie Thorne, San Jose, CA (US); Gary Takushi, Milpitas, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/371,618

(22) Filed: Aug. 10, 1999

(51) Int. Cl.$^7$ ............................................. H04L 12/413
(52) U.S. Cl. ....................................................... 370/448
(58) Field of Search ................................. 370/445, 446, 370/447, 448, 229, 230; 709/235

(56) References Cited

U.S. PATENT DOCUMENTS

| | | | | |
|---|---|---|---|---|
| 5,436,903 A | * | 7/1995 | Yang et al. | 370/448 |
| 5,650,997 A | * | 7/1997 | Yang et al. | 370/448 |
| RE36,353 E | * | 10/1999 | Yang et al. | 370/448 |
| 5,999,538 A | * | 12/1999 | Haddock et al. | 370/446 |
| 6,205,153 B1 | * | 3/2001 | Shaffer et al. | 370/445 |
| 6,222,850 B1 | * | 4/2001 | Johnson | 370/445 |

\* cited by examiner

*Primary Examiner*—Min Jung
(74) *Attorney, Agent, or Firm*—Wagner, Murabito & Hao LLP

(57) ABSTRACT

A method to dynamically adjust the maximum back off time of an Ethernet controller in a half duplex network. Specifically, one embodiment of the present invention includes a method for providing priority to a peripheral component (e.g., half duplex Network Interface Card) in a congested network. The method includes the step of determining a maximum back off time limit based on a number of collisions a first data packet encounters before being transmitted over a network. Furthermore, the method includes the step of detecting a collision of a second data packet during transmission of the second data packet by the peripheral component coupled to the network. Additionally, the method also includes the step of determining a back off time. It should be appreciated that the back off time is substantially equal to or less than the maximum back off time limit. Moreover, the method includes the step of causing the peripheral component to wait the back off time before trying to retransmit the second data packet over the network.

21 Claims, 4 Drawing Sheets

METHOD TO DYNAMICALLY ADJUST THE MAXIMUM BACK OFF TIME OF AN ETHERNET CONTROLLER IN A HALF DUPLEX NETWORK

TECHNICAL FIELD

The present invention relates generally to the field of computer networking. More particularly, the present invention relates to the field of data packet transmissions within an Ethernet network.

BACKGROUND ART

Computers have become an integral tool used in a wide variety of different applications, such as in finance and commercial transactions, computer-aided design and manufacturing, health care, telecommunication, education, etc. Computers are also finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via electronic mail (e-mail) and via video teleconferencing.

One popular type of computer network is known as a local area network (LAN). LANs connect multiple computers together such that the users of the computers can access the same information and share data. Typically, in order to be connected to a LAN, a general purpose computer requires an expansion board generally known as a Network Interface Card (NIC). Essentially, the NIC works with the operating system and Central Processing Unit (CPU) of a host computer to control the flow of information over the LAN. Some NICs may also be used to connect a computer to the Internet.

Typically, NICs are also used to communicate over a LAN communications network standard referred to as Ethernet. It is appreciated that if two NICs coupled to an Ethernet network each try to transmit a packet or frame of data at the same time within a half duplex network, a collision of those packets occurs. As such, each NIC involved in the collision backs off a random amount of time before trying to retransmit their respective data packet. Within the Ethernet network, each half duplex NIC is allowed 16 collisions to transmit a current data packet before discarding it in order to begin transmitting a subsequent data packet. Furthermore, as the number of collisions of a particular data packet increases within the Ethernet network, the half duplex NIC has an increased possibility of backing off for a longer amount time.

It should be appreciated that more and more half duplex NICs can be coupled to the Ethernet network enabling more and more computers to access the same information and share data. But there are disadvantages associated with numerous half duplex NICs being coupled to the Ethernet network. One of the main disadvantages is that as more and more half duplex NICs are coupled to the Ethernet network, there is an increased possibility of more and more data packet collisions thereby resulting in a more congested network. As such, a half duplex NIC of a particular computer (e.g., file server) which handles a high volume of data packet traffic is unable to efficiently transmit its data packets because of an increased occurrence of data packet collisions.

Accordingly, a need exists for a method and system for providing transmission priority to a half duplex Network Interface Card (NIC) of a particular computer station (e.g., file server) which is coupled to a congested Ethernet network.

DISCLOSURE OF THE INVENTION

Embodiments of the present invention provide a method and system for providing transmission priority to a half duplex Network Interface Card (NIC) of a particular computer station (e.g., file server) which is coupled to a congested Ethernet network. Furthermore, embodiments of the present invention provide a method and system which achieves the above accomplishment and also provides a method and system to dynamically adjust the maximum back off time of a half duplex NIC coupled to an Ethernet network.

Specifically, one embodiment of the present invention includes a method for providing priority to a peripheral component (e.g., half duplex Network Interface Card) in a congested network. The method includes the step of determining a maximum back off time limit based on a number of collisions a first data packet encounters before being transmitted over a network. Furthermore, the method includes the step of detecting a collision of a second data packet during transmission of the second data packet by the peripheral component coupled to the network. Additionally, the method also includes the step of determining a back off time. It should be appreciated that the back off time is substantially equal to or less than the maximum back off time limit. Moreover, the method includes the step of causing the peripheral component to wait the back off time before trying to retransmit the second data packet over the network.

In another embodiment, the present invention includes a computer system. The computer system includes a processor, an addressable data bus coupled to the processor, and a computer usable memory coupled to communicate with the processor for performing a method for providing priority to a peripheral component (e.g., half duplex Network Interface Card) coupled to a network. Specifically, the method includes the step of determining a maximum back off time limit based on a number of collisions a first data packet encounters before being transmitted over the network. Furthermore, the method includes the step of detecting a collision of a second data packet during transmission of the second data packet by the peripheral component coupled to the network. Additionally, the method includes the step of ascertaining a back off time. It should be appreciated that the back off time is substantially equal to or less than the maximum back off time limit.

In still another embodiment, the present invention includes a computer readable medium having computer readable code embodied therein for enabling a peripheral component coupled to a network to gain priority. Specifically, the computer readable medium causes the peripheral component to perform the step of ascertaining a maximum back off time limit based on a number of collisions a first data packet encounters before being transmitted over the network. Furthermore, the computer readable medium causes the peripheral component to perform the step of detecting a collision of a second data packet during transmission of the second data packet by the peripheral component coupled to the network. Moreover, the computer readable medium causes the peripheral component to perform the step of ascertaining a back off time. It should be appreciated that the back off time is substantially equal to or less than the maximum back off time limit. Additionally, the computer readable medium causes the peripheral component to perform the step of causing the peripheral component to wait the back off time before trying to retransmit the second data packet over the network.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
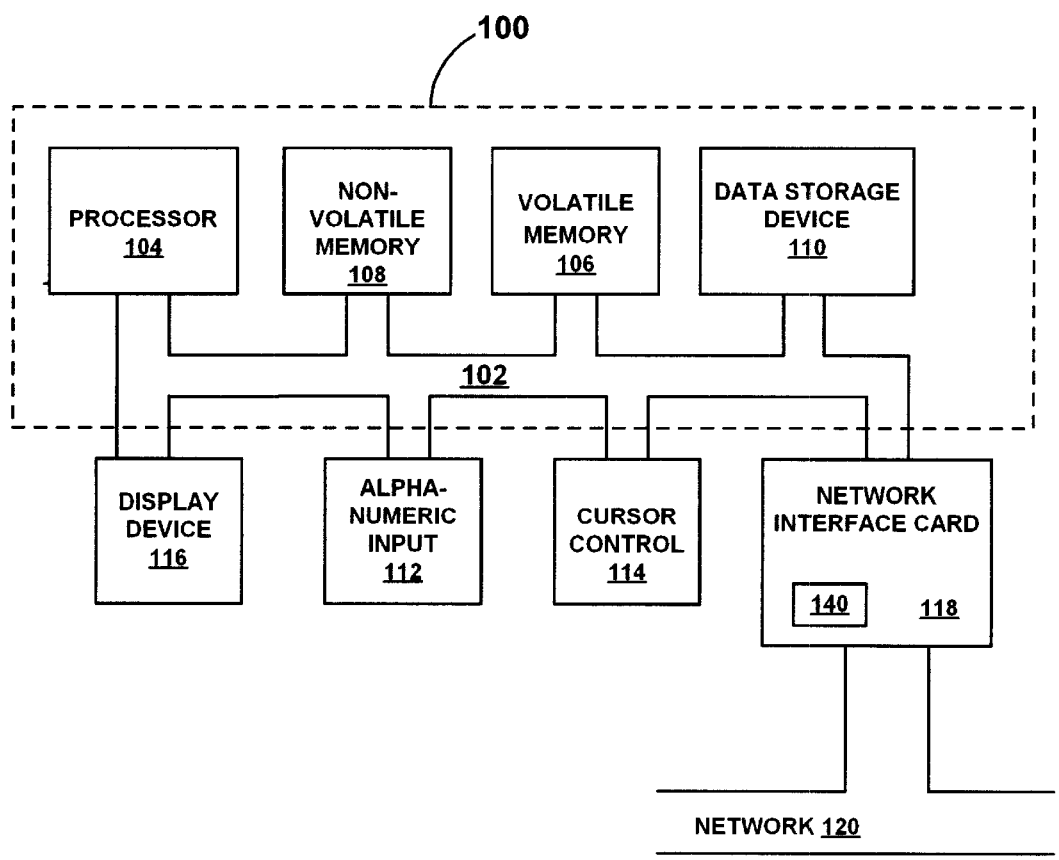
FIG. 1 is a block diagram of an exemplary computer system used in accordance with one embodiment of the present invention.

The drawings referred to in this description should not be understood as being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "detecting", "determining", "causing", "generating", "receiving", "using", "transmitting" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

With reference now to FIG. 1, portions of the present method and system are comprised of computer-readable and computer-executable instructions which reside, for example, in computer-usable media of a computer system. FIG. 1 illustrates an exemplary computer system 100 used to perform the present invention. It is appreciated that system 100 of FIG. 1 is only exemplary and that the present invention can operate within a number of different computer systems including general purpose networked computer systems, embedded computer systems, stand alone computer systems, and the like.

System 100 of FIG. 1 includes an address/data bus 102 for communicating information, and a central processor unit 104 coupled to bus 102 for processing information and instructions. Central processor unit 104 may be an 80×86-family microprocessor or any other type of processor. System 100 also includes data storage features such as a computer usable volatile memory 106 (e.g., random access memory, static RAM, dynamic RAM, etc.) coupled to bus 102 for storing information and instructions for central processor unit 104, computer usable non-volatile memory unit 108 (e.g., read only memory, programmable ROM, flash memory, EPROM, EEPROM, etc.) coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112, which includes alphanumeric and function keys, is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (e.g., cursor) on a display screen of display device 116. Many implementations of cursor control device 114 are known in the art including a mouse, trackball, touch pad, joystick or special keys on alphanumeric input device 112 capable of signaling movement of a given direction or manner of displacement. Alternatively, it is appreciated that a cursor can be directed and/or activated via input from alphanumeric input device 112 using special keys and key sequence commands. The present invention is also well suited to directing a cursor by other means such as, for example, voice commands. A more detailed discussion of the method and system embodiments of the present invention are found below.

With reference still to FIG. 1, a half duplex Network Interface Card (NIC) 118 in accordance with one embodiment of the present invention coupled to bus 102 is connected to a network 120 and controls the flow of information of computer system 100 over network 120. Specifically, data packets, such as Ethernet packets, that are incoming and outgoing via network 120 are transmitted and received by half duplex NIC 118. Furthermore, a back off time restrictor circuit 140 in accordance with one embodiment of the present invention is implemented as part of half duplex NIC 118. A more detailed discussion of half duplex NIC 118 and back off time restrictor circuit 140 in furtherance of the present invention is found below. It should be appreciated that the present invention is well suited for other types of Network Interface Cards and is not strictly limited to a half duplex Network Interface Card.

Detailed Description of the Structure and Operation of the Present Invention

In the following description of embodiments of the present invention, a Network Interface Card is a peripheral component. Although the present embodiments specifically recite a Network Interface Card, the present invention is also well suited to an embodiment employing various other peripheral components. That is, the present invention is well suited to an embodiment in which the peripheral component is, for example, a PCMCIA (personal computer memory card international association) card. Similarly, the present invention is well suited to an embodiment in which the peripheral component is, for example, a compact form factor I/O (input/output) card. Additionally, the present invention is well suited to be used in an embodiment in which the peripheral component is, for example, a rate controller, a small computer system interface (SCSI) controller, a graphics card, and the like. Furthermore, the present invention is well suited to be used, for example, in a non-peripheral component environment such as an Application Specific Integrated Circuit (ASIC) disposed on a motherboard, an embedded circuit, and the like.

As previously mentioned above, embodiments of the present invention provide a method and system for providing transmission priority to a half duplex Network Interface Card (NIC) of a particular computer station (e.g., file server) which is coupled to a congested Ethernet network. Within one embodiment in accordance with the present invention, this is accomplished by dynamically adjusting the maximum back off time limit of the half duplex NIC in order to shorten the length of time of all or a portion of its back off times corresponding to data packet collisions. As such, the half duplex NIC potentially waits for a shorter amount of time before attempting to retransmit a particular data packet as compared to other typical half duplex NICs coupled to the Ethernet network. In this manner, the half duplex NIC in accordance with the present invention has transmission priority within the congested Ethernet network. It should be appreciated that one of the purposes for dynamically adjusting the maximum back off time limit of the half duplex NIC is to provide it transmission priority during fluctuations in the transmission congestion of the Ethernet network. Furthermore, another purpose for dynamically adjusting the maximum back off time limit is to prevent the half duplex NIC from over utilizing the transmission bandwidth of the Ethernet network. In other words, to restrain the half duplex NIC from completely hogging the transmission bandwidth of the Ethernet network.

Figure 2:
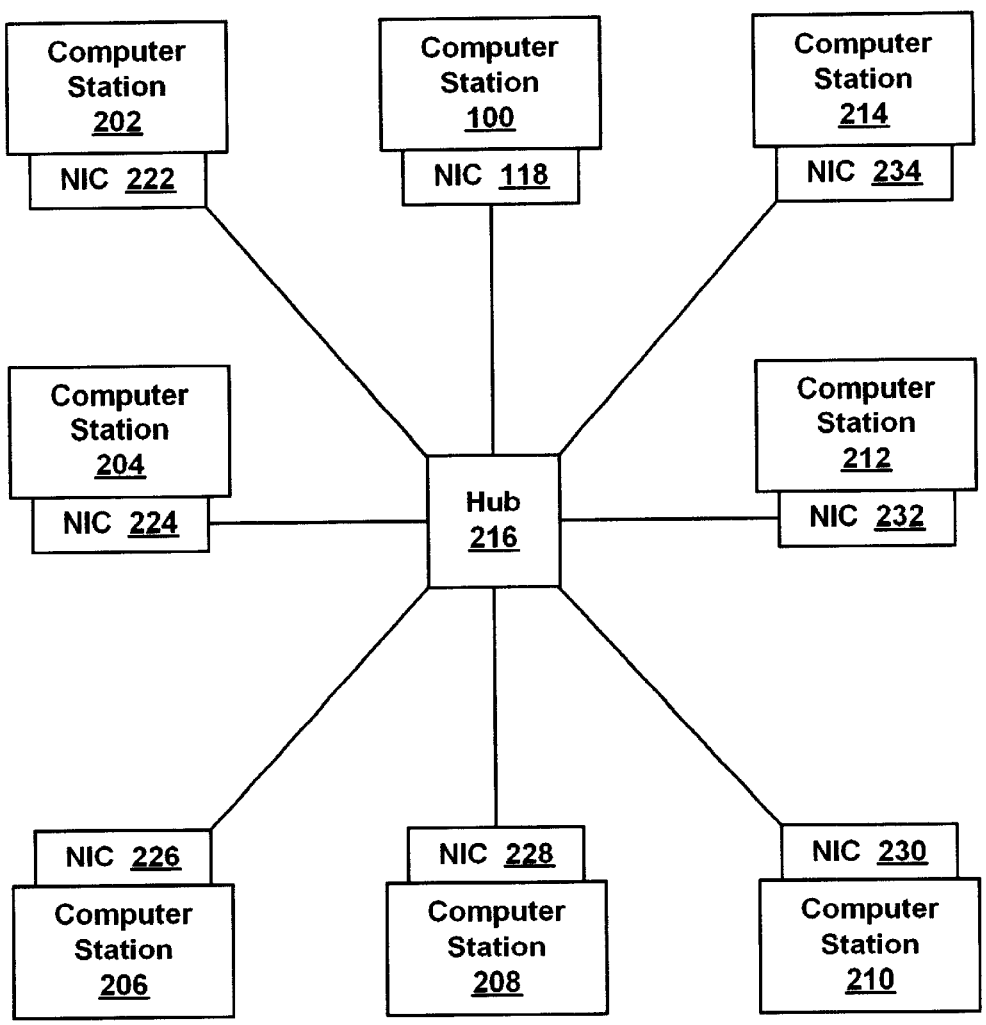
FIG. 2 is a block diagram of an Ethernet network used in accordance with one embodiment of the present invention.

With reference now to FIG. 2, which is a block diagram of an Ethernet network 120 used in accordance with one embodiment of the present invention. It should be appreciated that the present invention is not strictly limited to operation within Ethernet network 120. On the contrary, the present invention is well suited for operation within different types of communication networks. As such, Ethernet network 120 is an exemplary network used in accordance with one embodiment of the present invention. Within FIG. 2, it is appreciated that computer station 100 of FIG. 1 is coupled to and is part of Ethernet network 120. Specifically, half duplex NIC 118 of computer station 100 is coupled to a hub 216 of Ethernet network 120. The operation and functionality of hub 216 is well known by those of ordinary skill in the art. Moreover, half duplex NICs 222, 224, 226, 228, 230, 232 and 234 of computer stations 202, 204, 206, 208, 210, 212 and 214, respectively, are each coupled to hub 216. By coupling half duplex NICs 222–234 and 118 in this manner, users of computer stations 202–214 and 100 have access to the same information and are able to share data within Ethernet network 120.

Within Ethernet network 120, it is appreciated that if two or more of half duplex NICs 222–234 and 118 try to transmit a data packet or frame at the same time, a collision of those data packets occurs. As such, each half duplex NIC involved in the collision backs off a random amount of time before trying to retransmit their respective data packet. Each one of half duplex NICs 222–234 and 118 is allowed 16 collisions to transmit a particular data packet before discarding it in order to begin transmitting a subsequent data packet. Additionally, as the number of collisions of a particular data packet increases up to the value of 10, half duplex NICs 222–234 have an increased possibility of backing off for a longer amount time. As to this particular functionality, it is important to note that half duplex NIC 118 of computer station 100 does not operate in the same manner as half duplex NICs 222–234 of computer stations 202–214.

Specifically, one embodiment in accordance with the present invention dynamically adjusts the maximum back off time limit of half duplex NIC 118 of FIG. 2 in order to shorten the length of time of all or a portion of its back off times corresponding to data packet collisions. As such, the back off times of half duplex NIC 118 are substantially equal to or less than the maximum back off time limit. In this manner, half duplex NIC 118 potentially waits for a shorter amount of time before attempting to retransmit a particular data packet as compared to half duplex NICs 222–234 of Ethernet network 120. As such, half duplex NIC 118 achieves transmission priority over half duplex NICs 222–234 of computer stations 202–214 within Ethernet network 120.

Figure 3:
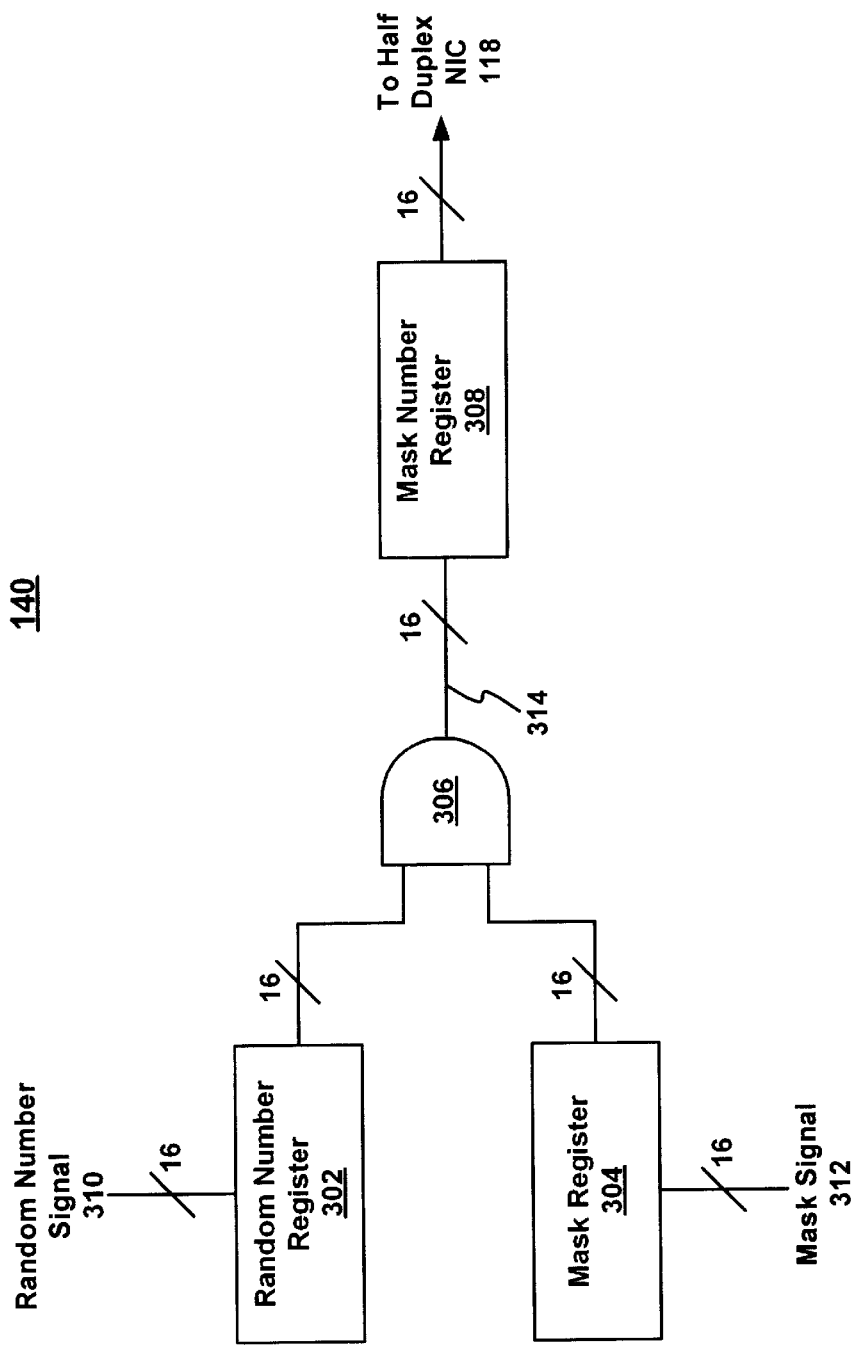
FIG. 3 is a schematic diagram of a back off time restrictor circuit in accordance with one embodiment of the present invention which is implemented as part of a half duplex Network Interface Card (NIC).

Referring now to FIG. 3, which is a schematic diagram of a back off time restrictor circuit 140 implemented as part of half duplex NIC 118, in accordance with one embodiment of the present invention. It should be appreciated that the present invention is well suited for a variety of different embodiments for performing the functionality of back off time restrictor circuit 140. As such, back off time restrictor circuit 140 is an exemplary circuit used in accordance with one embodiment of the present invention. One of the main functions of back off time restrictor circuit 140 is to dynamically restrict the length of time of all or a portion of the back off times of half duplex NIC 118. Therefore, half duplex NIC 118 potentially waits for a shorter amount of time before attempting to retransmit a particular data packet as compared to half duplex NICs 222–234. In this fashion, back off time restrictor circuit 140 causes half duplex NIC 118 to have transmission priority over half duplex NICs 222–234 within Ethernet network 120.

Generally, when half duplex NIC 118 detects a collision of a data packet that it is transmitting, back off time restrictor circuit 140 receives a random number signal 310 which is stored within a random number register 302. Additionally, a mask signal 312 is stored within a mask register 304. The mask signal 312 and the random number signal 310 are input into a logical AND gate 306, where they are bit-wise ANDed together to produce a masked number signal 314. Within the present embodiment, the function of mask signal 312 is to mask or restrict the value of random number signal 310, which results in masked number signal 314. The masked number signal 314 is stored within a masked number register 308. The restricted value represented by masked number signal 314 is subsequently used by half duplex NIC 118 to determine its back off time for the corresponding data packet collision. Therefore, by changing the value of mask signal 312, the present embodiment is able to adjust the maximum back off time limit of half duplex NIC 118.

Specifically, with reference still to FIG. 3, when half duplex NIC 118 detects a collision of a data packet that it is transmitting, a random number generator function (not shown) produces random number signal 310. Within the present embodiment, the determination of the value of random number signal 310 by the random number generator function complies with the 802.3 specification of the Institute of Electrical and Electronics Engineers (IEEE). Specifically, X is equal to the number of collisions of the data packet while Y is equal to the value of X or 10, whichever has a smaller value. The random number generator function then determines the value of random number signal 310 by randomly choosing an integer value N which is within the value range of 1 to $2^Y$, inclusively. For example, if X is equal to the value of 5, then Y is equal to the value of 5, since 5 has a smaller value than 10. The random number generator function then determines the value of random number signal 310 by randomly choosing the integer value of 15, which is within the value range of 1 to 32, inclusively. It should be appreciated that determining a random number value in this fashion is part of the 802.3 specification of the IEEE, which is well known by those of ordinary skill in the art.

Within the present embodiment, the random number register 302, which is a 16 bit register, is coupled to receive the random number signal 310 from the random number generator function. Upon receiving random number signal 310, the random number register 302 temporary stores it. Furthermore, mask signal 312 is stored within mask register 304, which is also a 16 bit register. It should be appreciated that one embodiment for determining the value of mask signal 312 in accordance with the present invention is described in detail below with reference to FIG. 4. The outputs of random number register 302 and mask register 304 are coupled to inputs of AND gate 306. As such, mask signal 312 and random number signal 310 are output to AND gate 306, where they are bit-wise ANDed together to produce masked number signal 314. It should be understood that the determined length of the back off time of half duplex NIC 118 is directly related to the value of masked number signal 314. Specifically, as the value of masked number signal 314 becomes smaller, the determined back off time becomes shorter. It should be further appreciated that mask signal 312 of the present embodiment is specifically used to mask part or all of the bits of random number signal 310 in order to produce masked number signal 314. As such, mask signal 312 is used by the present embodiment to establish a maximum value limit for the resulting masked number signal 314.

For example, in order to restrict the value of the masked number signal 314 to the value of the 4 least significant bits of random number signal 310, the 12 most significant bits of mask signal 312 are set equal to zero while its 4 least significant bits are set equal to 1. In this manner, AND gate 306 produces a masked number signal 314 equal to the value of the 4 least significant bits of random number signal 310. As such, mask signal 312 is used by the present embodiment to mask out the 12 most significant bits of random number signal 310 in order to produce masked number signal 314. Within another example, if all 16 bits of mask signal 312 are equal to zero, AND gate 306 produces a masked number signal 314 having a value equal to zero. Therefore, it is appreciated that the mask signal 312 of the present embodiment can be utilized to restrict the value of the masked number signal 314 to the value of any number of bits of random number signal 310.

Referring still to FIG. 3, the outputs of AND gate 306 are coupled to inputs of masked number register 308. As such, masked number signal 314 is output by AND gate 306 to masked number register 308, which is a 16 bit register. Masked number register 308 outputs the restricted value represented by masked number signal 314 to half duplex NIC 118. In order to determine the length of its back off time, half duplex NIC 118 of the present embodiment multiples the value of masked number signal 314 by 512 clock cycles. The resulting number of clock cycles is the determined length of time for the back off time of half duplex NIC 118. As such, by changing the value of mask signal 312, the present embodiment is able to adjust the maximum back off time limit of half duplex NIC 118.

Figure 4:
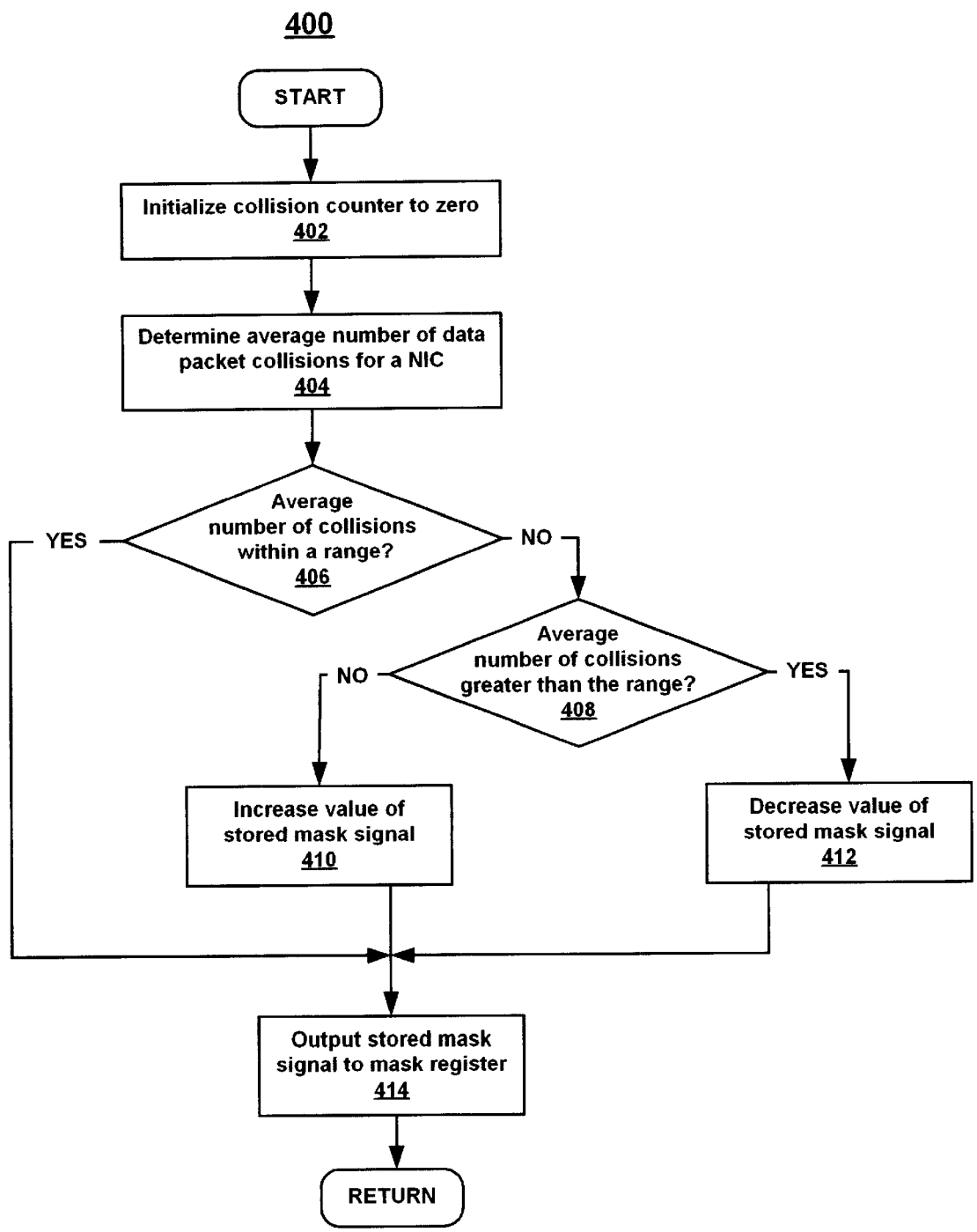
FIG. 4 is a flowchart of steps performed in accordance with one embodiment of the present invention for dynamically adjusting the value of the mask signal of FIG. 3.

With reference now to FIG. 4, a flowchart 400 of steps performed in accordance with one embodiment of the present invention for dynamically adjusting the value of mask signal 312 of FIG. 3 is shown. It is appreciated that as the value of mask signal 312 is adjusted by the present embodiment, the maximum back off time limit of half duplex NIC 118 is adjusted in order to provide it transmission priority over Ethernet network 120. Flowchart 400 includes processes of the present invention which, in one embodiment, are carried out by a processor and electrical components under the control of computer readable and computer executable instructions. The computer readable and computer executable instructions reside, for example, in data storage features such a computer usable volatile memory unit 104 and/or computer usable non-volatile memory unit 106 of FIG. 1. Although specific steps are disclosed in flowchart 400 of FIG. 4, such steps are exemplary. That is, the present invention is well suited to performing various other steps or variations of the steps recited in FIG. 4.

At step 402, in one embodiment of the present invention, a collision counter is initialized to the value of zero. It should be appreciated that the collision counter of the present embodiment is used to determine the amount of collisions a data packet experiences before being transmitted over Ethernet network 120. It should be further appreciated that the collision counter of the present embodiment can be implemented in software or hardware (e.g., statistic register).

In step 404 of FIG. 4, the present embodiment determines an average number of data packet collisions experienced by half duplex NIC 118. Specifically, for a predetermined number of data packets, the present embodiment determines the amount of collisions each data packet experiences before finally being transmitted over Ethernet network 120 by half duplex NIC 118. It is appreciated that the present embodiment utilizes the collision counter initialized in step 402 in order to keep track of the collisions of each data packet. As part of step 404, the present embodiment totals the amount of collisions each data packet experienced thereby resulting in a data packet collision total. The data packet collision total is divided by the predetermined number of data packets as part of step 404, thereby resulting in an average number of data packet collisions experienced by half duplex NIC 118. It should be appreciated that the determination of an average number of data packet collisions experienced by half duplex NIC 118 of the present embodiment can be performed in a variety of ways.

At step 406, the present embodiment determines whether the average number of data packet collisions experienced by half duplex NIC 118 is within a predetermined value range. For example, the predetermined value range of the present embodiment could be equal to the values of 3 to 5, inclusively. It is appreciated that the predetermined value range of the present embodiment is well suited to be equal to many different values. At step 406, if the average number of data packet collisions experienced by half duplex NIC 118 is within the predetermined value range, the present embodiment proceeds to step 414. If the average number of data packet collisions experienced by half duplex NIC 118 is not within the predetermined value range during step 406, the present embodiment proceeds to step 408.

In step 408 of FIG. 4, the present embodiment determines whether the average number of data packet collisions experienced by half duplex NIC 118 is greater than the predetermined value range. If the average number of data packet collisions experienced by half duplex NIC 118 is greater than the predetermined value range during step 408, the present embodiment proceeds to step 412. At step 408, if the average number of data packet collisions experienced by half duplex NIC 118 is not greater than the predetermined value range, the present embodiment proceeds to step 410.

At step 410, the present embodiment increases the stored value of mask signal 312. For example, given the 12 most significant bits of the stored value of mask signal 312 are equal to zero and its 4 least significant bits are equal to 1. At step 410, the present embodiment sets the 11 most significant bits of the stored value of mask signal 312 equal to zero and sets its 5 least significant bits equal to 1. In this manner, the present embodiment increases the stored value of mask signal 312. It should be appreciated that step 410 of the present embodiment can be performed in a variety of ways in accordance with the present invention.

In step 412 of FIG. 4, the present embodiment decreases the stored value of mask signal 312. For example, given the 12 most significant bits of the stored value of mask signal 312 are equal to zero and its 4 least significant bits are equal to 1. At step 412, the present embodiment sets the 13 most significant bits of the stored value of mask signal 312 equal to zero and sets its 3 least significant bits equal to 1. In this manner, the present embodiment decreases the stored value of mask signal 312. It should be appreciated that step 412 of the present embodiment can be performed in a variety of ways in accordance with the present invention.

At step 414, the present embodiment outputs the stored value of mask signal 312 to mask register 304 of FIG. 3, as previously described above. After completing step 408, the present embodiment of flowchart 400 is exited. As such, the present embodiment of flowchart 400 dynamically adjusts mask signal 312 which results in the dynamic adjustment of the maximum back off time limit of half duplex NIC 118. As such, the present embodiment provides half duplex NIC 118 transmission priority over Ethernet network 120.

Thus, embodiments of the present invention provide a method and system for providing transmission priority to a half duplex Network Interface Card (NIC) of a particular computer station (e.g., file server) which is coupled to a congested Ethernet network. Furthermore, embodiments of the present invention provide a method and system which achieves the above accomplishment and also provides a method and system to dynamically adjust the maximum back off time of a half duplex NIC coupled to an Ethernet network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for providing priority to a peripheral component in a congested network, said method comprising:
    (a) determining a maximum back off time limit based on a number of collisions a first data packet encounters before being transmitted over a network;
    (b) detecting a collision of a second data packet during transmission of said second data packet by said peripheral component coupled to said network;
    (c) determining a back off time, wherein said back off time is substantially equal to or less than said maximum back off time limit; and
    (d) causing said peripheral component to wait said back off time before trying to retransmit said second data packet over said network.

2. The method as described in claim 1, wherein (a) comprises:
    determining said maximum back off time limit based on said number of collisions said first data packet encounters before being transmitted over said network, wherein said maximum back off time limit increases in value as said number of collisions decreases in value.

3. The method as described in claim 1, wherein (a) comprises:
    determining said maximum back off time limit based on said number of collisions said first data packet encounters before being transmitted over said network, wherein said maximum back off time limit decreases in value as said number of collisions increases in value.

4. The method as described in claim 1, wherein (a) comprises:

determining said maximum back off time limit based on said number of collisions said first data packet encounters before being transmitted over said network, wherein said maximum back off time limit is based on a number generated by a random number generator function.

5. The method as described in claim 1, wherein (b) comprises:

detecting said collision of said second data packet during transmission of said second data packet by said peripheral component coupled to said network, wherein said peripheral component comprises a Network Interface Card (NIC).

6. The method as described in claim 1, wherein (b) comprises:

detecting said collision of said second data packet during transmission of said second data packet by said peripheral component coupled to said network, wherein said network comprises an Ethernet network.

7. The method as described in claim 1, wherein (c) comprises:

determining said back off time, wherein said back off time is associated with an Ethernet network.

8. A computer system comprising:

a processor;

an addressable data bus coupled to said processor;

a computer usable memory coupled to communicate with said processor for performing a method for providing priority to a peripheral component coupled to a network, said method comprising:

(a) determining a maximum back off time limit based on a number of collisions a first data packet encounters before being transmitted over said network;

(b) detecting a collision of a second data packet during transmission of said second data packet by said peripheral component coupled to said network; and (c) ascertaining a back off time, wherein said back off time is substantially equal to or less than said maximum back off time limit.

9. The computer system as described in claim 8 wherein (a) comprises:

determining said maximum back off time limit based on said number of collisions said first data packet encounters before being transmitted over said network, wherein said maximum back off time limit increases in value as said number of collisions decreases in value.

10. The computer system as described in claim 8 wherein (a) comprises:

determining said maximum back off time limit based on said number of collisions said first data packet encounters before being transmitted over said network, wherein said maximum back off time limit decreases in value as said number of collisions increases in value.

11. The computer system as described in claim 8 wherein (a) comprises:

determining said maximum back off time limit based on said number of collisions said first data packet encounters before being transmitted over said network, wherein said maximum back off time limit is based on a number generated by a random number generator function.

12. The computer system as described in claim 8 wherein said peripheral component comprises a Network Interface Card (NIC).

13. The computer system as described in claim 8 wherein said network comprises an Ethernet network.

14. The computer system as described in claim 8 wherein (c) comprises:

ascertaining said back off time, wherein said back off time is associated with an Ethernet network.

15. A computer readable medium having computer readable code embodied therein for enabling a peripheral component coupled to a network to gain priority, comprising:

(a) ascertaining a maximum back off time limit based on a number of collisions a first data packet encounters before being transmitted over said network;

(b) detecting a collision of a second data packet during transmission of said second data packet by said peripheral component coupled to said network;

(c) ascertaining a back off time, wherein said back off time is substantially equal to or less than said maximum back off time limit; and (d) causing said peripheral component to wait said back off time before trying to retransmit said second data packet over said network.

16. The computer readable medium as described in claim 15, wherein (a) comprises:

ascertaining said maximum back off time limit based on said number of collisions said first data packet encounters before being transmitted over said network, wherein said maximum back off time limit increases in value as said number of collisions decreases in value.

17. The computer readable medium as described in claim 15, wherein (a) comprises:

ascertaining said maximum back off time limit based on said number of collisions said first data packet encounters before being transmitted over said network, wherein said maximum back off time limit decreases in value as said number of collisions increases in value.

18. The computer readable medium as described in claim 15, wherein (a) comprises:

ascertaining said maximum back off time limit based on said number of collisions said first data packet encounters before being transmitted over said network, wherein said maximum back off time limit is based on a number generated by a random number generator function.

19. The computer readable medium as described in claim 15, wherein (b) comprises:

detecting said collision of said second data packet during transmission of said second data packet by said peripheral component coupled to said network, wherein said peripheral component comprises a Network Interface Card (NIC).

20. The computer readable medium as described in claim 15, wherein (b) comprises:

detecting said collision of said second data packet during transmission of said second data packet by said peripheral component coupled to said network, wherein said network comprises an Ethernet network.

21. The computer readable medium as described in claim 15, wherein (c) comprises:

ascertaining said back off time, wherein said back off time is associated with an Ethernet network.

* * * * *